United States Patent [19]
Stoll et al.

[11] Patent Number: 5,125,065
[45] Date of Patent: Jun. 23, 1992

[54] INTEGRATED OPTICAL ARRANGEMENT HAVING AT LEAST ONE OPTICAL WAVEGUIDE INTEGRATED ON A SUBSTRATE OF A SEMICONDUCTOR MATERIAL AND THE METHOD OF MANUFACTURE

[75] Inventors: Lothar Stoll; Ulrich Wolff; Gustav Mueller, all of Munich, Fed. Rep. of Germany

[73] Assignee: Siemens Aktiengesellschaft, Berlin and Munich, Fed. Rep. of Germany

[21] Appl. No.: 572,413

[22] Filed: Aug. 27, 1990

[30] Foreign Application Priority Data

Sep. 1, 1989 [DE] Fed. Rep. of Germany ....... 3929131

[51] Int. Cl.[5] ................................................. G02B 6/12
[52] U.S. Cl. ..................................... 385/130; 385/131
[58] Field of Search ........................... 350/96.11–96.14

[56] References Cited

U.S. PATENT DOCUMENTS 4,185,256  1/1980  Scifres et al. ................. 350/96.11 X
4,685,763  8/1987  Tada et al. ..................... 350/96.11 X

OTHER PUBLICATIONS

K. Ishida et al "InGaAsP/InP Multimode Optical Switches Operated by a Carrier Induced Refractive Index Change" *IOOC-ECOC* '85 pp. 357-360.

J. Krauser et al "Electro-optic modulators in GaInAsP-/InP" *SPIE* vol. 587 Optical Fiber Sources and Detectors (1985) pp. 180-187.

Charles H. Henry et al "The Effect of Intervalence Band Absorption on the Thermal Behavior of InGaAsP Lasers" *IEEE Journal of Quantum Electronics*, vol. QE-19, No. 6, Jun. 1983, pp. 947-952.

Markus-Christian Aman et al, "Analytical solution for the lateral current distribution in multiple stripe laser diodes" *Appl. Phys. Lett.*, vol. 48, No. 25, Jun. 23, 1986, pp. 1710-1712.

*Primary Examiner*—Akm E. Ullah
*Attorney, Agent, or Firm*—Hill, Van Santen, Steadman & Simpson

[57] ABSTRACT

An integrated optical arrangement having at least one optical waveguide integrated a substrate of semiconductor material, characterized by the waveguide being a rib waveguide comprising the p-doped material disposed on a substrate which contains a waveguiding layer which is either an n-doped or an undoped material, said arrangement having either a pn or a pin junction between the p-doped material of the rib and the n-doped or undoped material of the waveguiding layer. In addition, a method for forming the various layer is disclosed.

8 Claims, 2 Drawing Sheets

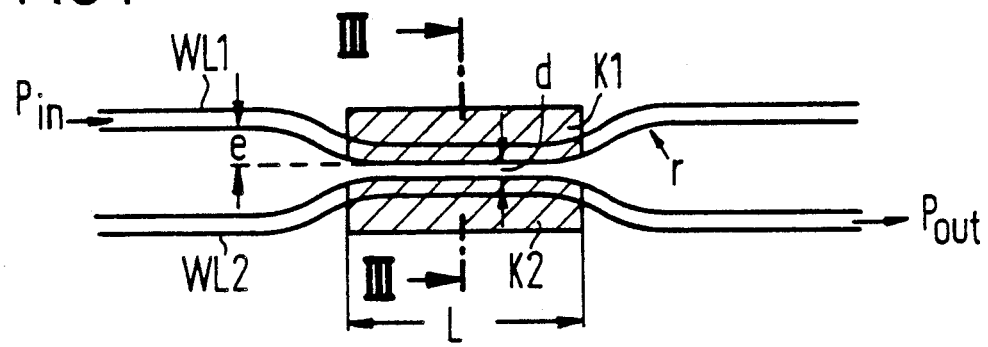
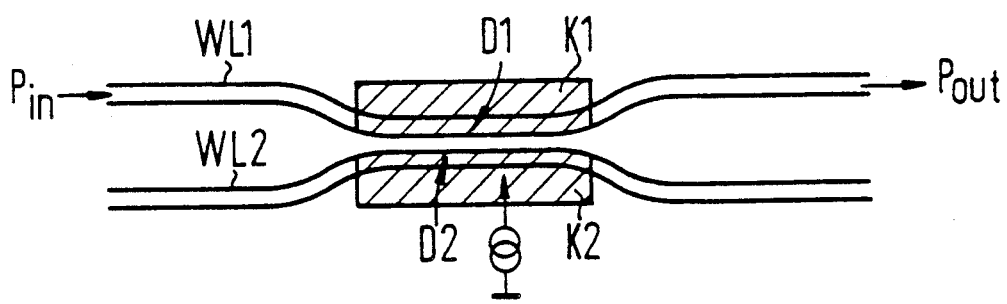
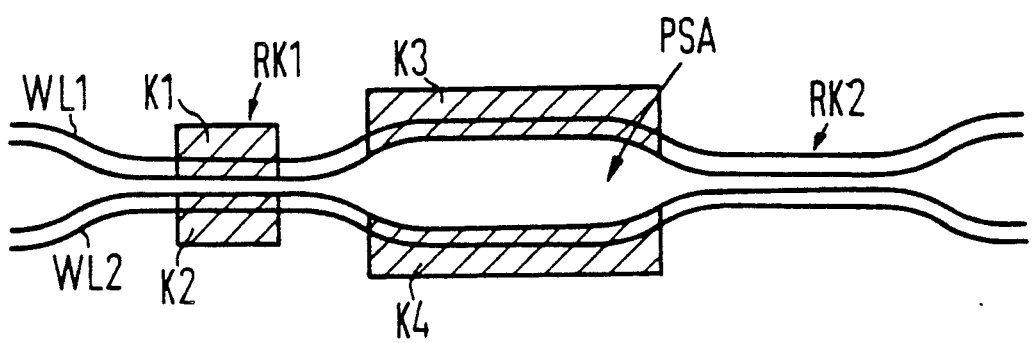

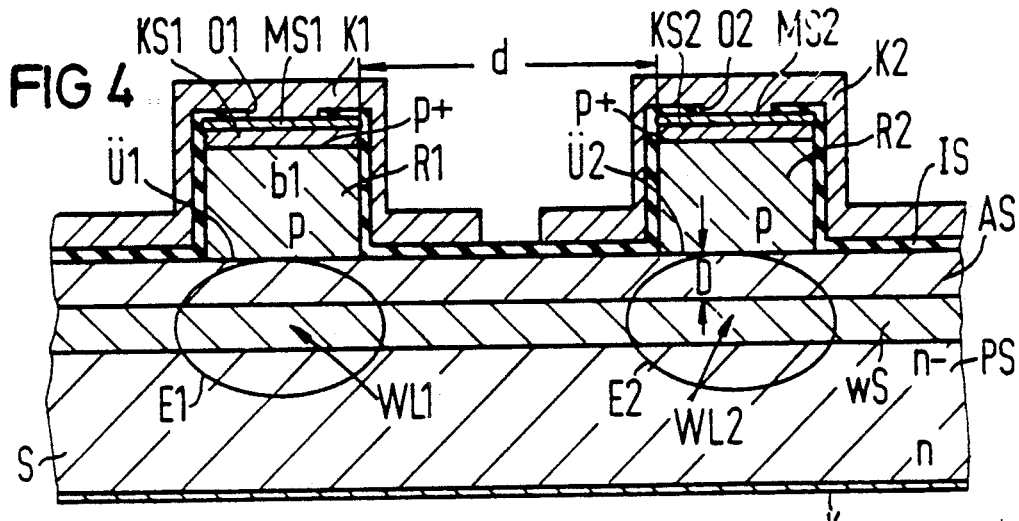
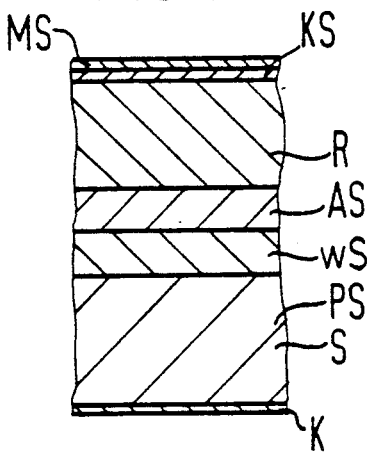
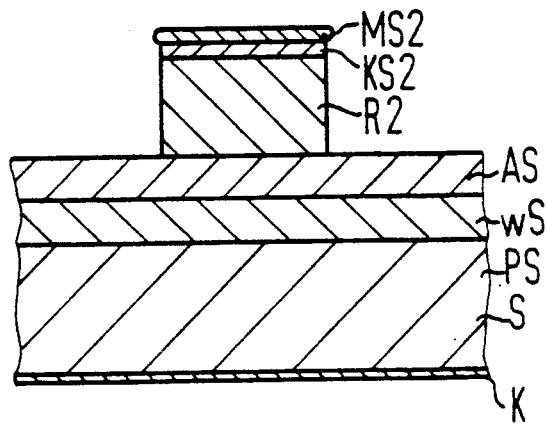
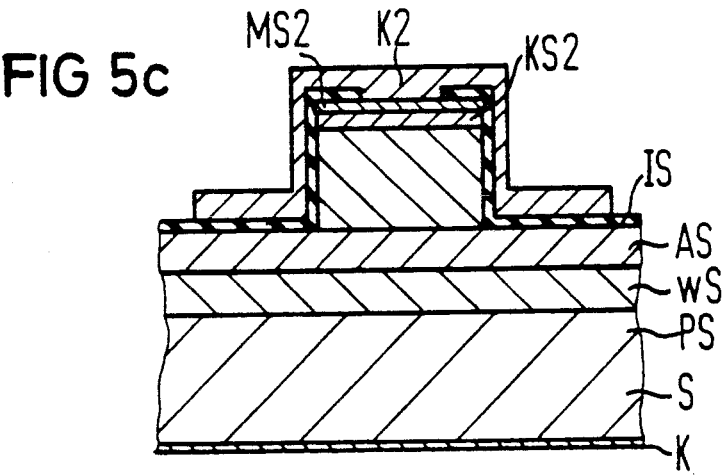

INTEGRATED OPTICAL ARRANGEMENT HAVING AT LEAST ONE OPTICAL WAVEGUIDE INTEGRATED ON A SUBSTRATE OF A SEMICONDUCTOR MATERIAL AND THE METHOD OF MANUFACTURE

BACKGROUND OF THE INVENTION

The present invention is directed to an integrated optical arrangement having at least one optical waveguide integrated on a substrate of semiconductor material and to the method of forming the integrated optical arrangement.

For example, integrated optical arrangements having optical waveguides integrated on a substrate of a semiconductor material are optical switches or tunable filters that require waveguides in which the propagation constant of the mode guided in the waveguide can be varied by an electrical signal. The variation of the propagation constant can be achieved by varying the effective refractive index of the waveguide either by injecting electrical charge carriers, such as a plasma effect (see *IOOC-ECOC*, pp. 357-360, 1985) or by employing an electrical field which is an electro-optical effect (see *SPIE*, Vol. 587, pp. 180-187, 1985).

In addition to passive waveguides, integrated optical circuits often contain such electrically controllable waveguides, active waveguides, as well as lasers and amplifiers. The manufacture and connection of these various elements on a common substrate makes the manufacture of such an integrated optical circuit more difficult.

SUMMARY OF THE INVENTION

It is an object of the present invention to provide an integrated optical arrangement of the above-mentioned type, wherein the same waveguide, which can be employed as a passive waveguide and can also be operated as an electrically controllable waveguide, is also a low-loss waveguide.

These objects are achieved by an improvement in an integrated optical arrangement comprising at least one strip-shaped optical waveguide being integrated on a substrate of semiconductor material, the improvements include that the waveguide is composed of a rib waveguide being defined by either an undoped or an n-doped waveguiding layer on a substrate and by a rib of a semiconductor material formed above this layer, a junction between the rib and underlying material, which is either from the p-doped to an n-doped material to form a pn junction or a p-doped to an undoped and from the undoped to an n-doped material to form a pin junction can be contacted from the outside, and this junction is integrated in the region of the rib waveguide either above or below the waveguiding layer and is integrated so that the junction of the p-doped to n-doped or the undoped material is arranged at a distance from the waveguiding layer and the p-doped material is arranged at a side of this junction facing away from this layer.

It is known that losses in optical waveguides on semiconductor materials are mainly produced by p-doped materials (see *IEEE Journ. Quant. Electron.*, Vol. QE-19, pp. 947-952, 1983). In the arrangement of the invention, the waveguiding layer is not p-doped and the junction from the p-doped to the n-doped or undoped material is arranged at a distance from the waveguiding layer so that the p-doped material is arranged at the side of this junction facing away from this waveguiding layer. This result is a lower overlap between the optical mode guided in the waveguiding layer and the loss-producing p-doped material. This will, thus, result in a considerable reduction of the losses of the waveguiding layer.

The rib waveguide of the invention can be advantageously employed as a low-loss passive waveguide and can also be operated as a low-loss, electrically controllable waveguide when the pn or, respectively, the pin junction is electrically contacted. A combination of passive waveguide and controllable waveguide can be advantageously manufactured with the same rib waveguide of the invention in that the pn or the pin junction extends over the entire length of the rib and when the junction is externally provided with means for electrical contacting a predetermined section of the waveguide. The non-contacting section of the rib waveguide forms a low-loss passive waveguide and the contact is controlled by applying an electrical signal to the contact, dependent on the polarization on the basis of charge carrier injection or on the basis of an electrical field. As a result thereof, the technical requirements needed in the manufacture of the integrated optical circuit having active waveguides, electrically controllable waveguides and passive waveguides are considerably reduced.

In the case of the charge carrier injection into the waveguiding layer, the pn junction or, respectively, the pin junction is used as a diode operated in the conducting direction and when the electro-optical effect is utilized, the junction is used as a diode operating in a non-conducting direction. In order for this to be possible, the waveguiding layer must be arranged between the differently doped materials of this junction. For the sake of simplicity, the material of the one doping of the junction is contained in the rib and the material of the other doping is contained in the substrate, at least under the waveguiding layer. This has the advantage that the rib and the substrate can be externally provided with electrical contacts for contacting the junction. Preferably, the p-doped material is contained in the rib and the n-doped material is contained in the substrate, at least under the waveguiding layer.

In a preferred development of the arrangement of the invention, the rib and the substrate are composed of InP and the waveguiding layer is composed of InGaAsP. A spacer layer of InGaAsP, which has a refractive index that is lower in comparison to the material of the waveguiding layer, is contained in a space between the junction from the p to the n or the undoped material and the waveguiding layer. The arrangement of the invention can also be fashioned in other semiconductor materials, for example in a system of GaAlAs/GaAs.

Advantageously, the spacing between the junction of the p-doped to the n-doped or undoped material from the waveguiding layer is selected smaller than the diffusion length of the electrical charge carrier to be induced in this layer. Given employment of charge carrier injection, this spacing can, then, advantageously have no critical influence on the carriers induced in the waveguiding layer. What this arrangement can achieve is that the losses in the waveguide that proceed parallel to the rib waveguide at a slight lateral spacing of, for example a few $\mu m$, are not significantly increased by the free charge carriers. This is beneficial for the realization of low-loss optical switches, for example in the form of integrated optical directional couplers.

In the case of the control by an electrical field, it is advantageous that the field extend in the region between the junction of the p to the n-doped or undoped material and the waveguiding layer, as well as into this layer itself, whereby it overlaps well with the mode guided in the waveguiding layer and in that it extends only slightly, for example 1 μm, laterally beyond the edge of the rib. As a result thereof, a good spacial resolution is established for the design of the low-loss optical switches.

An excellently low-loss optical switch can be obtained with the arrangement of the present invention when two rib waveguides of the invention are employed, wherein a guided optical mode is adiabatically coupled from one waveguide to the other.

In a preferred embodiment of the arrangement that can be employed as an optical switch, two rib waveguides are integrated on the substrate that proceed side-by-side in sections at such a slight spacing that an optical mode guided in one rib waveguide can laterally cross over into the other guide. Each of the rib waveguides is composed of an n-doped or undoped waveguiding layer of the substrate and a respective rib of a semiconductor material fashioned over this layer, whereby a respective pn or pin junction will extend over the entire length of the rib and can be contacted from the outside is integrated in the region of each rib waveguide above or below the waveguiding layer and is integrated therein so that the junction of the p to n or undoped material is arranged at a spacing from the waveguiding layer and has the p-doped material arranged at the side of this junction facing away from this layer. Thus the pn or pin junction of at least one rib waveguide is contacted in sections.

The embodiment is excellently suited for the realization of low-loss optical switches in the form of integrated optical directional couplers and in the form of integrated optical Mach-Zehnder interferometers. In directional couplers, the pn or pin junction of at least one rib waveguide must be contacted in the coupling region for electrical control. In the Mach-Zehnder interferometer that comprises a phase-shifter region arranged between two 3 dB directional couplers, the contact can be applied both in the region of the coupler, as well as the phase-shifter region.

An arrangement of the invention having one waveguide or a structure of a plurality of waveguides can be manufactured in a simple way, in that the initial member in the form of a substrate of n-doped semiconductor material is utilized on which an n-doped or undoped waveguiding layer is then applied. An n-doped or undoped spacer layer is applied on the waveguiding layer and a layer of p-doped semiconductor material is then applied on this spacer layer. The p-doped layer is then eroded down or removed to the spacer layer so that one or more ribs of p-doped material are left standing to define the rib waveguide or structure of the rib waveguides. The ribs are covered with an electrically insulating layer in which a contact window is formed for each rib to be contacted and then electrical contact electrodes that have a cooperating contact electrode applied on the n-doped substrate are then applied onto the ribs.

Other advantages and features of the invention will be readily apparent from the following description of the preferred embodiments, the drawings and claims.

BRIEF DESCRIPTION OF THE DRAWINGS

FIG. 1 is a schematic plan view illustrating the arrangement of the invention in the form of an integrated optical directional coupler that can be employed as an optical switch;

FIG. 2 is a view similar to FIG. 1 with the switch in a different switch-over condition;

FIG. 3 is a schematic plan view of an arrangement of the present invention in the form of an integrated optical Mach-Zehnder interferometer that, likewise, is employed as an optical switch;

FIG. 4 is a cross sectional view taken along the line III—III of FIG. 1 to show the structure of the rib waveguide of the invention in the position of the junction with reference to the waveguiding layer; and FIGS. 5a–5c are cross sectional views showing various stages in the manufacture, with FIG. 5a being a cross sectional view of an initial member; FIG. 5b being of an intermediate stage; and FIG. 5c being of a final stage.

DESCRIPTION OF THE PREFERRED EMBODIMENTS

The principles of the present invention are particularly useful when incorporated in an integrated optical directional coupler, which is illustrated schematically in FIGS. 1 and 2 and is composed of two integrated optical waveguides WL1 and WL2 that proceed at a slight distance d side-by-side in a coupling region L so that a guided optical mode can cross over in this region L from one to the other waveguides. By electrically controlled variations of the effective refractive index of at least one waveguide, such a directional coupler can, as known, be operated as an optical switch.

The special nature of this directional coupler lies therein that the waveguides WL1 and WL2 are rib waveguides of the invention and each have a respective pn or pin junction extending over the entire length of the appertaining rib. This junction is electrically contacted in the coupling region L. For example, both rib waveguides are dimensioned so that they have the same effective refractive index and the length of the coupling region L is selected so that the light power $P_{IN}$ coupled into the waveguide, for example the waveguide WL1, completely crosses over into the other waveguide WL2 in the coupling region L and can be taken therefrom as an output power $P_{OUT}$, as illustrated in FIG. 1.

By applying a defined electrical signal to the contact electrode K2 of the waveguide WL2, the effective refractive index of the waveguide WL2 is varied to such an extent induced by the charge carriers or induced by an electrical field that no cross over of the input power $P_{IN}$ from the waveguide WL1 into the waveguide WL2 will occur. In this case, the input power $P_{IN}$ can be taken from the waveguide WL1 as output power $P_{OUT}$ and the directional coupler is then switched into the other switch condition, as illustrated in FIG. 2.

The integrated optical Mach-Zehnder interferometer is schematically illustrated in FIG. 3 and is composed of two 3 dB directional couplers RK1 and RK2 between which a phase shifter section PSA is arranged. Here, too, the special nature lies wherein the waveguides WL1 and WL2 are rib waveguides of the invention and each have a pn or pin junction that extends over the entire length of the rib, with this junction, for example, being electrically contacted in the coupling region of the directional coupler RK1 and/or in the phase shifter region PSA. The contact electrodes applied on the ribs of the rib waveguides are referenced K1 through K4 in FIG. 3.

A detailed structure of the directional coupler of FIGS. 1 and 2 is illustrated in FIG. 4 and stands for other arrangements of the invention. The n-doped substrate S of InP has a more likely n-doped buffer region PS of InP on which a waveguiding layer wS of InGaAsP is applied. This layer wS should be undoped as far as possible. In practice, this cannot be achieved or can only be achieved with difficulty for manufacture-associated reasons and an unintentionally doped layer wS must be accepted. This doping should be an optimally light n-doping and there definitely cannot be any p-doping. A spacer layer AS of InGaAsP is applied on the waveguiding layer wS. This spacer layer AS is to be likewise undoped or, at most, optimally lightly n-doped for the same reasons as the waveguiding layer wS. This spacer layer AS must have a lower refractive index than the waveguiding layer wS.

Ribs R1 and R2, which are p-doped InP, have a longitudinal direction, which is perpendicular to the plane of the drawing and are applied on the spacer layer AS. Together with the waveguiding layer wS which lies therebelow, each rib R1 or R2 defines a waveguide WL1 or WL2 whose cross sectional region is approximately limited by the closed curve E1 or E2, respectively. Thus, a guided optical mode is essentially guided in the waveguiding layer wS within the appertaining curved region E1 or E2.

A junction ü1 or, respectively, ü2 of a p-doped material of the rib R1 or R2 to the n-doped or undoped material of the spacer layer AS is arranged at a distance D from the waveguiding layer wS which corresponds to the thickness of this layer AS.

An electrically insulating layer IS is applied on each rib R1 and R2, with a contact window O1 or O2 being formed in this layer IS at least where the rib R1 or R2 is to be contacted. For better contacting, each rib R1 and R2 has a p-doped layer KS1 or, respectively, KS2 of InGaAs at its upper side on which a metal layer MS1 or, respectively, MS2 is applied. In the region of the contact window O1 or O2, this layer MS1 or, respectively, MS2 is in contact with a metal contact electrode K1 or K2, which is applied on the electrically insulating layer IS. A cooperating electrode K for these contact electrodes K1 and K2 is applied on the outside of the n-doped substrate S. The distance between the waveguides WL1 and WL2 is essentially the same as the distance d between the ribs R1 and R2.

In the preferred, specific exemplary embodiment of the arrangement of FIG. 4, the thickness of the n-doped substrate S amounts to approximately 100 $\mu$m and its n-doping amounts to approximately $5 \cdot 10^{18}/cm^3$. The buffer layer PS has a thickness of approximately 3 $\mu$m and an n-doping of approximately $10^{17}/cm^3$. The waveguiding layer wS and the spacer layer AS each have a respective thickness of approximately 0.4 $\mu$m and respective n-doping of, at most, $10^{16}/cm^3$. The quaternary material of the waveguiding layer wS has a gap wavelength $\lambda_G$ of approximately 1.30 $\mu$m and the spacer layer AS has a gap wavelength $\lambda_G$ of approximately 1.05 $\mu$m. Each rib R1 and R2 has a thickness of approximately 1.5 $\mu$m and a width of approximately 3 $\mu$m and a p-doping of approximately $2 \cdot 10^{17}/cm^3$. This spacing d in the coupling region L amounts to approximately 3 $\mu$m. The thickness of each p+-doped layer KS1 and KS2 amounts to approximately 0.2 $\mu$m, and this p+-doping is greater than $10^{19}/cm^3$. Each metal layer MS1 and MS2 is composed of a Ti/Pt or of a Ti/Au. Each contact electrode K1 and K2 is composed of Au or Ti/Au and the cooperating electrode K is composed of AuGe/Ni/Au. The electrically insulating layer IS is composed of an $AL_2O_3$.

The coupling region L is approximately 980 $\mu$m long and the overall length of the directional coupler amounts to approximately 2 mm. The lateral offset e of the waveguides, as illustrated in FIG. 1, amounts to approximately 20 $\mu$m, and the radius of curvature r amounts to 10 mm. The lateral effective refractive index difference $\Delta n_{EFF}$ of each waveguide amounts to approximately $5 \cdot 10^{-3}$.

For example, the specific exemplary embodiment can be operated with an operating wavelength $\lambda$ of approximately 1.56 $\mu$m and with an extreme low operating current of approximately 4 mA. This embodiment will have an insertion loss of only approximately 1.3 dB in both switching conditions.

The method of the invention for manufacturing an arrangement of the invention is set forth in greater detail with reference to an example of manufacturing the above-described specific exemplary embodiment with the steps illustrated in FIGS. 5a-5c.

An initial member is shown in fragmentary cross sectional fashion in FIG. 5a and is manufactured in the following way. A waveguiding layer wS of InGaAsP, the spacer layer AS of InGaAsP and a p-doped layer R of InP are successively grown by a liquid-phased epitaxy on an upper surface of an n-doped substrate S of InP in the form of a wafer having a lightly n-doped buffer region PS. A $p^{30}$-doped layer KS of InGaAs is generated on the surface of the layer R. Subsequently, the substrate S is reduced in thickness to approximately 100 $\mu$m. For the formation of the cooperating electrodes K, AuGe/Ni/Au is vapor-deposited and alloyed on the underside of the substrate S. For the formation of the metal layer MS, an approximately 15 nm layer of Ti and an approximately 500 nm thick layer of Pt or Au with which the contact is formed, are applied onto the $p^{30}$-doped layer KS.

The ribs R1 and R2 of the rib waveguides are manufactured in that a material erosion with ions is first undertaken, wherein both the thin metal layer MS, as well as the p+-doped layer KS, are partially removed in the desired areas. Photoresist can be employed as a mask in this process step, because the etching depth amounts to only about 0.3 $\mu$m. The exposed, p-doped InP material is then removed down to the spacer layer AS by a wet chemical etching. The etching is thereby selectively carried out, whereby the etching process advantageously comes to a stop by itself at the spacer layer AS, which functions as an etching stop layer. The ribs having nearly vertical sidewalls will remain when these are aligned along the [011] direction. A fragmentary fashion of FIG. 5b shows the intermediate stage that has occurred after these method steps, wherein, for example, only the rib R2 is illustrated.

Subsequently, an approximately 0.3$\mu$ thick insulating layer IS of $Al_2O_3$ is sputtered onto the rib side substrate surface for insulating the ribs from the contact electrodes. The contact windows having a width of approximately 1 $\mu$m on the upper side or surface of the ribs are provided so that a contact window, such as O2 is opened with a projection lithograph and chemical etching process. A layer of Au or Ti/Au is then vapor-deposited onto the insulating layer IS and onto the layer of the Ti/Pt exposed by the contact window to engage the metal layer MS therebelow. The contact electrodes, such as the electrode K2, are then structured from this layer of Au or Ti/Au on the basis of a lift-off process. After this method step, the final stage shown in fragmentary fashion in FIG. 5c will be provided and forms the finished directional coupler.

Although various minor modifications may be suggested by those versed in the art, it should be understood that we wish to embody within the scope of the patent granted hereon all such modifications as reasonably and properly come within the scope of our contribution to the art.

We claim:

1. In an integrated optical arrangement comprising at least one strip-shaped optical waveguide integrated on a substrate of semiconductor material, the improvements comprising said waveguide being a rib waveguide defined by a waveguiding layer of the substrate and a rib of semiconductor material being formed above this layer, said waveguiding layer being a material selected from a group consisting of undoped materials and n-doped materials, said arrangement including a junction between a p-doped material and a non-p-doped material being integrated in the region of the rib waveguide, either above or below the waveguiding layer, said junction being arranged at a distance from the waveguiding layer with the p-doped material of the junction being arranged on a side of the junction facing away from the waveguiding layer, said arrangement including means for contacting said junction from the outside.

2. In an arrangement according to claim 1, wherein the p-doped material is contained in the rib and the n-doped material is contained in the substrate, at least under the waveguiding layer.

3. In an arrangement according to claim 2, wherein the rib and the substrate are composed of InP and the waveguiding layer is composed of InGaAsP and includes a spacer layer of InGaAsP having a refractive index that is lower in comparison to the material of the waveguiding layer being disposed between the waveguiding layer and said junction.

4. In an arrangement according to claim 3, wherein the distance between the junction and the waveguiding layer is selected to be shorter than a diffusion length of electrical charge carrier to be introduced in said waveguiding layer.

5. In an arrangement according to claim 4, which includes two rib waveguides being integrated on the substrate proceeding side-by-side in sections at a slight distance so that an optical mode guided in one rib waveguide laterally crosses over into the other rib waveguide, each rib waveguide being defined by the waveguiding layer of a material selected from a group consisting of n-doped materials and undoped materials and by a respective rib of semiconductor material positioned above said waveguiding layer, each of the rib waveguides having a junction, which is contactable from the outside, extending over the entire length of the rib being integrated in the region of each rib waveguide above or below the waveguiding layer and being integrated so that the junction of p-doped material to another material is arranged at a distance from the waveguiding layer and the p-doped material is arranged at the side of said junction, respectively, that faces away from said layer and, thereby, the junction of at least one rib waveguide is contacted in said sections.

6. In an integrated optical arrangement according to claim 2, wherein the waveguiding layer is of a n-doped material and said junction is a pn junction.

7. In an integrated optical arrangement according to claim 2, wherein an undoped layer is interposed between said p-doped rib and the substrate and said junction is a pin junction.

8. A method of forming an integrated optical arrangement having at least one strip of optical waveguide integrated on the substrate of a semiconductor material, said waveguide being a rib waveguide defined by a rib of p-doped material being disposed on a substrate of n-doped material, said substrate of n-doped material having a waveguiding layer spaced from the rib of p-doped material, and said waveguide having a junction between the p-doped material and the n-doped material, said method comprising the steps of providing a substrate of n-doped semiconductor material, forming a waveguiding layer of a material selected from a group consisting of n-doped and undoped materials on a surface of the substrate, providing a spacer layer on said waveguiding layer, said spacer layer being selected from said group of materials, providing a p-doped layer on said spacer layer, removing portions of said p-doped layer down to said spacer layer to form a rib for each waveguide, covering said rib with an electrically insulating layer, forming a contact window in said insulating layer adjacent each rib, forming electrical contacts on said insulating layer engaging said rib through said window, and applying a second electrode on a surface of the substrate opposite said ribs.

* * * * *